United States Patent
Ohmert (10) Patent No.: US 11,294,796 B2
(45) Date of Patent: *Apr. 5, 2022

(54) VEHICLE APPLICATION SIMULATION ENVIRONMENT

(71) Applicant: INRIX, INC., Kirkland, WA (US)

(72) Inventor: Steven Timothy Ohmert, Vashon, WA (US)

(73) Assignee: INRIX Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,095

(22) Filed: May 27, 2020

(65) Prior Publication Data

US 2020/0285566 A1 Sep. 10, 2020

Related U.S. Application Data (63) Continuation of application No. 15/351,728, filed on Nov. 15, 2016, now Pat. No. 10,671,514.

(51) Int. Cl.
*G06F 11/36* (2006.01)
*G07C 5/00* (2006.01)
*G07C 5/02* (2006.01)

(52) U.S. Cl.
CPC ...... *G06F 11/3664* (2013.01); *G06F 11/3696* (2013.01); *G07C 5/008* (2013.01); *G07C 5/02* (2013.01)

(58) Field of Classification Search
CPC . G06F 11/3664; G06F 11/3696; G07C 5/008; G07C 5/02
See application file for complete search history.

(56) References Cited

U.S. PATENT DOCUMENTS

| 5,660,547 A | 8/1997 | Copperman |
| 6,550,052 B1 | 4/2003 | Joyce et al. |

(Continued)

FOREIGN PATENT DOCUMENTS

WO 2007/060094 A2 5/2007

OTHER PUBLICATIONS

International Patent Application No. PCT/US2017/060750, International Search Report and Written Opinion of the International Searching Authority, dated Jun. 1, 2018.

(Continued)

*Primary Examiner* — Douglas M Slachta
(74) *Attorney, Agent, or Firm* — Cooper Legal Group, LLC (57) ABSTRACT

One or more techniques and/or systems are provided for facilitating simulation of an application used to access features of a vehicle. For example, an application developer may use an application development environment to develop an application that is used to display information through a vehicle display, obtain telemetry data from the vehicle, and/or modify vehicle features of the vehicle. However, the application development environment may not have real-time access to a vehicle (e.g., while the vehicle is being driven), which significantly reduces the ability to test the application. Accordingly, vehicle parameter signals may be simulated and provided to application code of the application (e.g., the application developer may specify a fan speed as "high", preprogrammed vehicle speed data may be supplied to the application code, etc.). In this way, the application can be tested as though the application had access to an operational vehicle.

20 Claims, 8 Drawing Sheets

(56) References Cited

U.S. PATENT DOCUMENTS

| | | | |
|---|---|---|---|
| 7,103,460 B1* | 9/2006 | Breed | B60C 23/0408 |
| | | | 701/29.1 |
| 8,161,454 B2* | 4/2012 | Srinivasan | A61B 3/113 |
| | | | 717/106 |
| 8,423,849 B2* | 4/2013 | Qin | G06F 11/3696 |
| | | | 714/741 |
| 8,612,100 B2* | 12/2013 | Goy | B60R 16/02 |
| | | | 701/48 |
| 8,612,102 B2 | 12/2013 | Ohhigashi et al. | |
| 8,612,192 B2* | 12/2013 | Larsson | G05B 17/02 |
| | | | 703/8 |
| 8,688,311 B2* | 4/2014 | Shelcusky | G07C 5/008 |
| | | | 701/29.1 |
| 8,739,049 B2 | 5/2014 | Kropinski et al. | |
| 9,053,590 B1* | 6/2015 | Kator | G06Q 10/087 |
| 9,685,098 B1 | 6/2017 | Kypri | |
| 9,715,442 B2 | 7/2017 | Alexander et al. | |
| 9,824,512 B2 | 11/2017 | Tseng et al. | |
| 10,013,816 B2* | 7/2018 | Nassar | G07C 5/0808 |
| 10,158,716 B2* | 12/2018 | Paridel | G06F 30/15 |
| 10,223,479 B1 | 3/2019 | Blake et al. | |
| 2003/0182027 A1* | 9/2003 | Mocek | H04L 67/02 |
| | | | 701/1 |
| 2005/0234622 A1* | 10/2005 | Pillar | B60W 50/029 |
| | | | 701/41 |
| 2006/0212540 A1 | 9/2006 | Chon et al. | |
| 2007/0244611 A1* | 10/2007 | Brozovich | G07C 5/0808 |
| | | | 701/31.5 |
| 2007/0294073 A1 | 12/2007 | Okamoto et al. | |
| 2009/0030614 A1 | 1/2009 | Carnegie et al. | |
| 2009/0204951 A1* | 8/2009 | Laurenti | G06F 11/3636 |
| | | | 717/128 |
| 2010/0262335 A1* | 10/2010 | Brozovich | G07C 5/008 |
| | | | 701/31.4 |
| 2011/0270486 A1 | 11/2011 | Stevens et al. | |
| 2012/0078440 A1* | 3/2012 | Oravis | F41G 3/22 |
| | | | 701/1 |
| 2012/0173121 A1* | 7/2012 | Willard | F02D 41/1495 |
| | | | 701/102 |
| 2012/0284287 A1* | 11/2012 | Klinker | G06Q 10/067 |
| | | | 707/754 |
| 2012/0311383 A1 | 12/2012 | Sul et al. | |
| 2013/0190946 A1* | 7/2013 | Yamauchi | G06F 17/00 |
| | | | 701/1 |
| 2003/0311032 | 11/2013 | Shelcusky et al. | |
| 2013/0311037 A1* | 11/2013 | Ukai | G07C 5/008 |
| | | | 701/36 |
| 2014/0282227 A1 | 9/2014 | Nixon et al. | |
| 2014/0365228 A1* | 12/2014 | Ng-Thow-Hing | G06F 3/017 |
| | | | 704/275 |
| 2015/0121148 A1* | 4/2015 | Hyodo | G06F 11/3636 |
| | | | 714/38.1 |
| 2016/0035152 A1* | 2/2016 | Kargupta | G06F 16/955 |
| | | | 701/31.5 |
| 2017/0024500 A1 | 1/2017 | Gnanaprakash et al. | |
| 2017/0103147 A1 | 4/2017 | Khanna et al. | |
| 2017/0178419 A1 | 6/2017 | Paridel et al. | |
| 2017/0228311 A1 | 8/2017 | Lee et al. | |

OTHER PUBLICATIONS

OpenXC Vehicle Simulator, 2013, Ford Motor Company.
Marcus Mazza, Vehicle Dynamics Testing-Expert Article on Virtual Simulations, Robson Forensic Inc, Apr. 1, 2016.

* cited by examiner

VEHICLE APPLICATION SIMULATION ENVIRONMENT

CROSS-REFERENCE TO RELATED APPLICATIONS

This application claims priority to and is a continuation of U.S. patent application Ser. No. 15/351,728, filed on Nov. 15, 2016 and titled "VEHICLE APPLICATION SIMULATION ENVIRONMENT", which is incorporated herein by reference.

BACKGROUND

Many vehicles comprise vehicle computing devices that control various aspects of a vehicle's operation. For example, a vehicle computing device of a vehicle may monitor engine temperature, control engine operation, implement cruise control settings, etc. The vehicle computing device may communicate over a vehicle controller area network (CAN) bus with other vehicle components. The vehicle computing device and the vehicle components may communicate using proprietary communication protocols and data formats. The vehicle may also comprise a vehicle navigation unit through which a user can adjust a radio, view navigational information, etc. The vehicle navigation unit may come preprogrammed from a vehicle manufacturer, and may use the same proprietary communication protocols and data formats of the vehicle computing device and vehicle components. Unfortunately, developing applications, such as a third party application, capable of communicating with the vehicle computing device, vehicle components, and/or the vehicle navigation unit may be difficult because of the proprietary nature of such components and computing devices.

Also, an application developer may be unable to adequately test how an application will function during operation of the vehicle. For example, the application developer may create the application within an application development environment hosted on a computing device, such as a laptop, desktop computer, or server. The computing device may not have access to a vehicle, and thus the application developer may be unable to test the application (e.g., the application may not have access to real-time driving data, such as current speed of a vehicle being driven). In an example, the application developer may be unable to see how a user interface of the application will visually appear through a vehicle display such as through the vehicle navigation unit. In another example, the application developer may be unable to obtain vehicle information, such as a current vehicle speed and other telemetry data, due to the computing device not having access to the vehicle, and thus any functionality associated with real-time vehicle operation data cannot be tested (e.g., a user interface element that warns a user of exceeding a speed limit cannot be tested without vehicle speed input).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for facilitating simulation of an application (e.g., any type of software or program that can execute on computing hardware, such as a desktop application, a mobile app, a web service, wearable device software, etc.) used to access features of a vehicle are provided. In an example, an application development environment may be exposed to an application developer for development of the application (e.g., an application that can be hosted on a vehicle computing device such as a vehicle navigation unit, or an application that can be hosted on a device separate from the vehicle such as a mobile device, a smart phone, a wearable device, a tablet, smart glasses, etc.). The application developer may generate application code for the application through the application development environment. For example, the application may be programmed to read vehicle operating signals, such as engine temperature, oil temperature, braking data, etc., and provide the user with comprehensive and predictive analysis on the overall condition of the vehicle with various potential maintenance suggestions. The application development environment may provide access to various application programming interfaces for data acquisition and interaction with various types of vehicles.

Response to receiving a simulate command through the application development environment for simulating the application code of the application, a vehicle parameter that is to be accessed by the application code may be identified. For example, an oil temperature parameter may be requested. Accordingly, a vehicle parameter signal of the vehicle parameter may be simulated. For example, the application developer may provide a value for the vehicle parameter signal, the value may be programmatically generated (e.g., by an algorithm, from preprogrammed values, etc.), or the value may be derived from a drive file within which real-time vehicle operation data was recorded during operation a vehicle. In this way, the vehicle parameter signal may be provided as input to the application code to create a simulation result. For example, a relatively high oil temperature value may be provided to the application code, which generates a visual alert to the user about a predicted future failure of the engine. Accordingly, the simulation result may be provided through the application development environment, such as though a simulated user interface representing how the application would appear to a driver of the vehicle (e.g., how the visual alert would appear within a user interface of the application that is displayed on a vehicle display such as the vehicle navigation unit, through a mobile device such as a smart phone or wearable device, etc.). During simulation of the application, the application developer may provide input to the application (e.g., the application developer may specify a new oil temperature parameter). In this way, the application may be tested as though the application had access to a vehicle during operation of the vehicle (e.g., as if the application had access to real-time vehicle information obtained from a vehicle bus to the vehicle while the vehicle is driven).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One or more computing devices and/or techniques for facilitating simulation of an application used to access features of a vehicle are provided. For example, an application developer may desire to develop an application that can interact with a vehicle (e.g., display a user interface through a vehicle navigation unit of the vehicle, collect and process telemetry data of the vehicle, control various functionality of the vehicle such as a radio and climate control settings, etc.). Unfortunately, the application developer may not have the ability to access an operational vehicle (e.g., access to real-time data of a vehicle while being driven) while developing the application (e.g., the application developer may be developing the application on a laptop, personal computer, server, etc.). Thus, the application developer may be unable to easily test the application (e.g., the application would be unable to access telemetry data or change the climate control settings if the application does not have real-time access to an operational vehicle). At best, the application developer may be able to test audio and/or display functionality, however, the display functionality may not provide a one-to-one correspondence to how the application will be displayed through the display of the vehicle (e.g., the vehicle may have a different resolution than the laptop, and a vehicle profile used to facilitate interaction between the application and the vehicle may impose various display constraints upon the application, such as a color scheme, what type of information can be displayed, what region of the display can be used to display information by the application, etc.).

Accordingly, as provided herein, an application development environment is provided where vehicle parameter signals can be simulated and provided to application code of the application so that the application can be tested as though it has real-time access to an operational vehicle. In this way, the application developer may quickly and efficiently test various aspects of the application, such as how the application processes telemetry data, how the application will appear through a display of the vehicle, whether the application is able to access and/or modify features of the vehicle such as turning on a light, etc.

Figure 1:
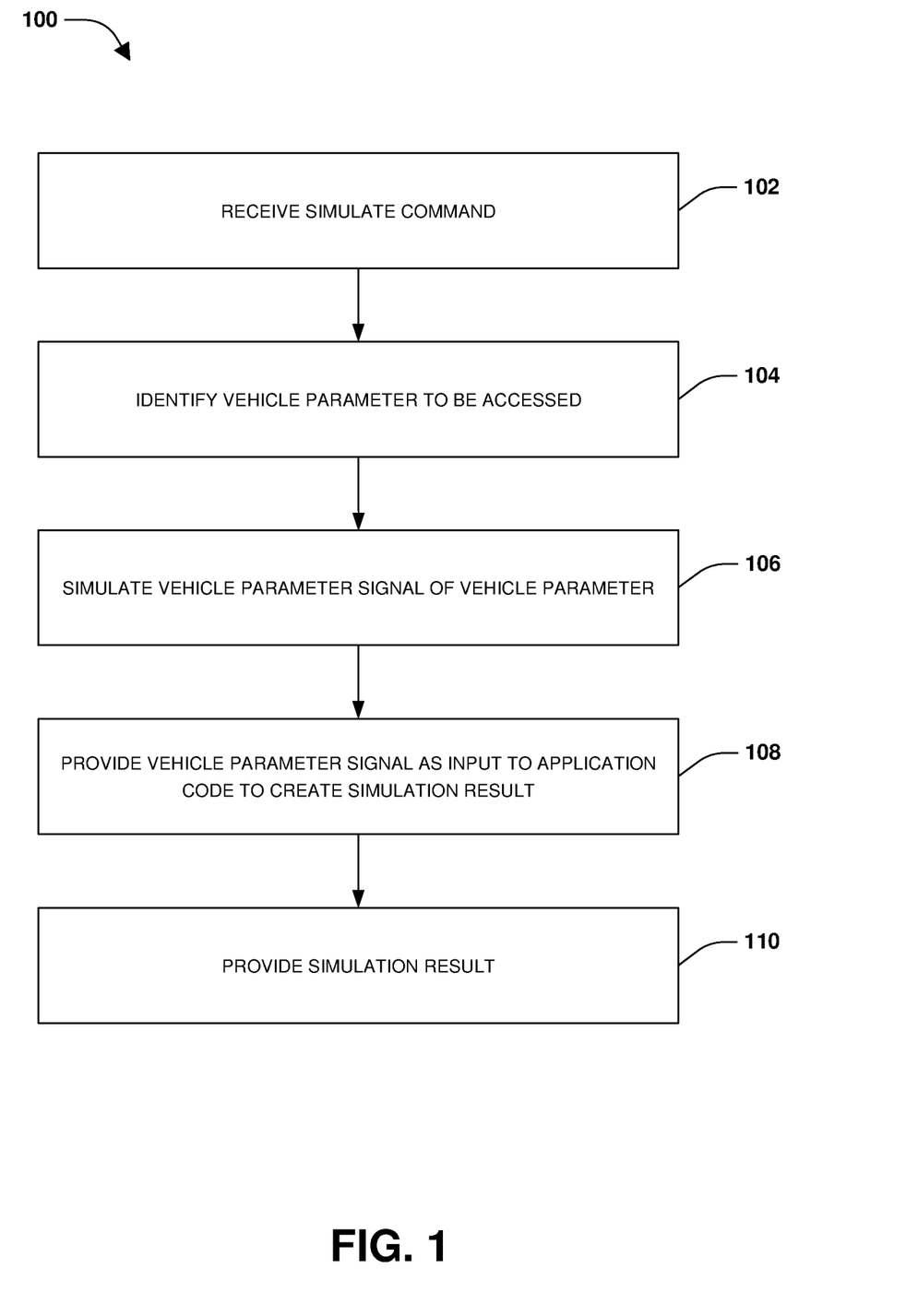
FIG. 1 is a flow diagram illustrating an exemplary method of facilitating development of an application.

An embodiment of facilitating simulation of an application used to access features of a vehicle is illustrated by an exemplary method 100 of FIG. 1. An application development environment may be exposed to an application developer for development of an application used to access features of a vehicle. For example, the application may be configured to display social network posts through a vehicle display such as a vehicle navigation unit, control lights of the vehicle, and/or collect fuel consumption data of the vehicle. Within the application development environment, the application developer may write application code, use predefined application code modules, use application programming interfaces for data acquisition and interaction with various types of vehicles (e.g., provided by vehicle profiles for such vehicles), use flow-based programming, etc. to create application code for the application.

The application developer may invoke a simulation command for simulating the application code of the application, which may be received through the application development environment, at 102. At 104, a vehicle parameter that is to be access by the application code may be identified. For example, the vehicle parameter may correspond to an interior light status parameter, a fuel consumption parameter, a request to display information on the vehicle display, etc. At 106, a vehicle parameter signal of the vehicle parameter may be simulated. In an example, the vehicle parameter signal may be provided by the application developer through a vehicle input component user interface of a simulation environment within the application development environment. The vehicle input component user interface may represent or simulate a vehicle input component of the vehicle (e.g., a user interface element representing an interior light on/off button or knob; a input box, a check box, a dropdown list, or other user interface element through which the application developer can specify the vehicle parameter signal such as an "on" value; etc.). In this way, the application developer can generate a vehicle input parameter signal to provide to the application code as the vehicle parameter signal.

In another example, the vehicle parameter signal can be programmatically generated. For example, the simulation environment may be preprogrammed with values for various types of vehicle parameters or may comprise an algorithm for selecting an appropriate value (e.g., an interior lights "on" lights, a left turn signal "on" value, a right turn signal "off" value, etc.). In an example, the value may rotate between values such as "on" and then "off" or may be randomly selected. In this way, various algorithms or predefined values may be used for the vehicle parameter signal.

In another example, the vehicle parameter signal can be provided based upon recorded values within a drive file that comprises a series of vehicle parameter values recorded from a vehicle bus during real-time operation of a vehicle (e.g., fuel consumption values of the vehicle over time while the vehicle was being driven, which can be used to similar fuel consumption during vehicle operation even though no vehicle is available to the application development environment). The series of vehicle parameter values may be provided to the application code or may be converted into a vehicle operation conception that can be understood by the application code can understand (e.g., the application code may understand "on" for an interior light as opposed to a binary "1" used by a vehicle computing device to represent "on"). In an example, the vehicle parameter signal may be a series of values, such as engine temperature values over time. In an example, the vehicle parameter signal may be filtered based upon a set of thresholds (e.g., the application code may merely request engine temperature values over a certain threshold indicative of an undesirable engine temperature increase).

At 108, the vehicle parameter signal may be provided as input to the application code to create a simulation result (e.g., the application code may perform some function based upon a determination that the fuel consumption is above a threshold, such as by providing an alert to a user or sending the alert to a remote server for further data collection and processing). In an example, the vehicle parameter signal may be formatted into a vehicle operation concept. For example, the vehicle parameter signal may comprise light status information, such as a binary "1" or "0" for "on" and for "off", that the application code does not understand, and thus the binary information may be translated into "on" or "off", which the application code can understand.

In an example, the vehicle profile may be used to determine whether the application code has access to certain types of vehicle parameters. For example, if the vehicle profile indicates that the vehicle parameter is allowed to be accessed by the application, then the vehicle parameter may be simulated. Otherwise, if the vehicle profile indicates that the vehicle parameter is not allowed to be accessed by the application, then the vehicle parameter may not be simulated and an alert or error may be provided to the application code and/or the application developer.

At 110, the simulation result may be provided through the application development environment. In an example, the simulation result may be displayed as an interactive driver emulation experience through the simulation environment. For example, the simulation result may correspond to how a user interface of the application will be displayed through a vehicle display (e.g., the vehicle profile may apply various constraints to the user interface such as a particular resolution, color scheme, font, display location, etc.). In this way, the application developer may be able to visually test and interact with the user interface of the application as it would be displayed to a driver while operating the vehicle. The application developer may provide input through the simulation environment (e.g., interact with a user interface element of the user interface, such as a button used to turn off a light), which may be provided to the application code as a vehicle input parameter signal.

The simulation environment may simulate how a vehicle computing device may process and/or respond to vehicle interaction commands from the application code (e.g., a command to adjust an interior light level of the vehicle). In this way, execution of a vehicle interaction command by the vehicle computing device may be simulated to create a vehicle interaction simulation result. For example, the vehicle profile may format the vehicle interaction command into a formatted command understood by the vehicle computing device. How the vehicle computing device would process the formatted command may be simulated, and a result may be provided back to the application code (e.g., a success message such that the interior light level is adjusted, a failure message where the interior light level is not adjusted, a lack of access rights message that the vehicle profile does not allow the application to modify the interior light level, etc.). In this way, the application developer can simulate how the application would interact with a vehicle during operation of the vehicle.

Figure 2:
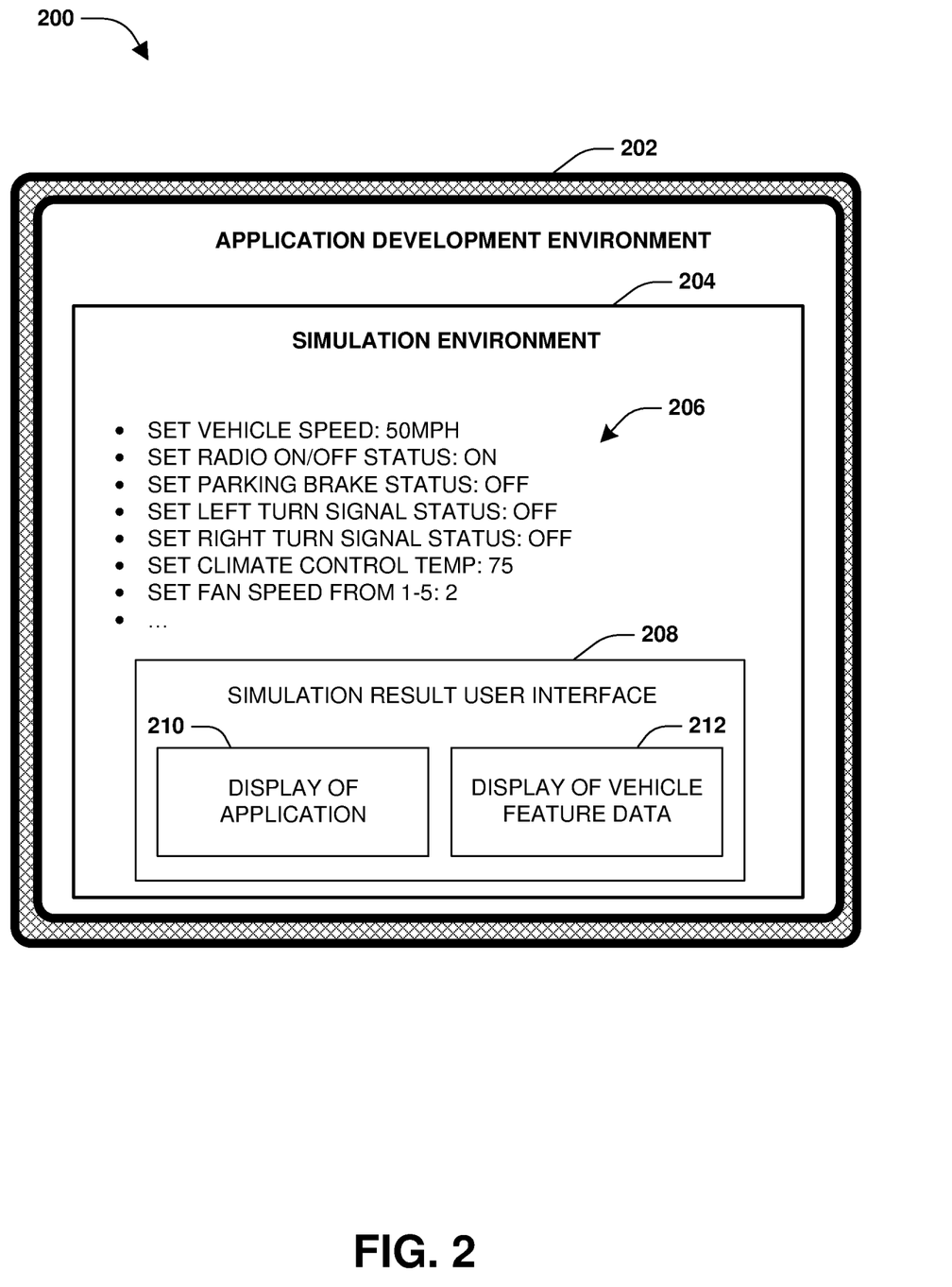
FIG. 2 is a component block diagram illustrating an exemplary system for facilitating development of an application.

FIG. 2 illustrates an example of a system 200 for facilitating simulation of an application used to access features of a vehicle. An application development environment 202 may be provided to an application developer of an application that is being developed to communicate and interact with the vehicle. For example, the application may be developed to provide users with access to vehicle telemetry, the ability to adjust climate control of the vehicle, and to display a social network user interface through which the user can view and share social network posts, images, and videos. Because the application development environment 202 may not have access to an operational vehicle, a simulation environment 204 is provided for testing the application. For example, the user may use vehicle input component user interfaces 206 to specify various vehicle input parameter signals (e.g., text input boxes, check boxes, drop-down lists, selection lists, etc.). For example, the user may specify a vehicle speed of 50 mph, a radio status of "on", a parking brake status of "off", a left turn signal status of "off", a right turn signal status of "off", a climate control temperature of 75 degrees, a fan speed of 2, etc. In an example, vehicle parameter signals may be programmatically created such as by an algorithm that can set various values for vehicle parameters requested by the application (e.g., if the application requests a windshield wiper status, a value such as "on" or "off" could be provided back to the application for testing). In another example, a drive file, within which a series of vehicle parameter values were recorded from a vehicle bus during real-time operation of a vehicle, may be used to provide the series of vehicle parameters values to the application (e.g., oil temperature that may change over time during the operation of the vehicle).

In this way, vehicle parameter signals may be simulated and provided to the application (e.g., in response to a request from the application for a particular vehicle parameter) for testing of the application. In an example, the simulation may be controlled based upon a vehicle profile for the vehicle. The vehicle profile may specify what telemetry data is allowed to be accessed by the application, what vehicle features (e.g., climate control) are allowed to be accessed by the application, how a user interface of the application is allowed to be rendered such as through a vehicle display (e.g., display resolution, size of the user interface, a region of the vehicle display within which the user interface is allowed to be displayed, a color scheme, etc.), what notifications are allowed to be provided to the user (e.g., a notification that the vehicle has irregular fuel consumption), what types of general attributes and specific attributes are available (e.g., a parking brake feature, a fuel cell status, etc.), what input commands are allowed and how to interpret such (e.g., a voice command "air on" will turn a climate control speed on to a value of "1"), what supplementary information is to be obtained and provided (e.g., when the application wants to display point of interest information, the vehicle will also display weather information for that point of interest), etc.

Simulating and providing the vehicle parameters to the application may result in a simulation result that is provided to the application developer through a simulation result user interface 208. For example, the application may request that the vehicle profile display a social network user interface through the vehicle display. The application may request display of a social network post, 2 images, and 1 video. The vehicle profile may allowed the social network post and the 2 images, but not the video (e.g., a driving safety policy, a data and/or processing resource consumption policy, and/or some other policy may restrict such data). The vehicle profile may format the user interface based upon a display property that enforces a blue color scheme, binds the user interface to a certain region of the vehicle display such as a low half of the vehicle display, adds a supplementary car logo as a faded background, etc.). The user interface may be displayed through a display of application user interface 210 so that the application developer can visualize how the user interface of the application will appear to a driver through the vehicle display. Because the application may modify various vehicle features, such as turning on a left turn signal, turning on all interior lights off, adjusting a driving mode to a sports mode, etc., vehicle feature data may be provided through a display of vehicle feature data user interface 212 so that the application developer can test whether the application is correctly modifying vehicle features (e.g., the display of vehicle feature data user interface 212 may display a left turn signal status, an interior light status, a driving mode, etc.).

Figure 3:
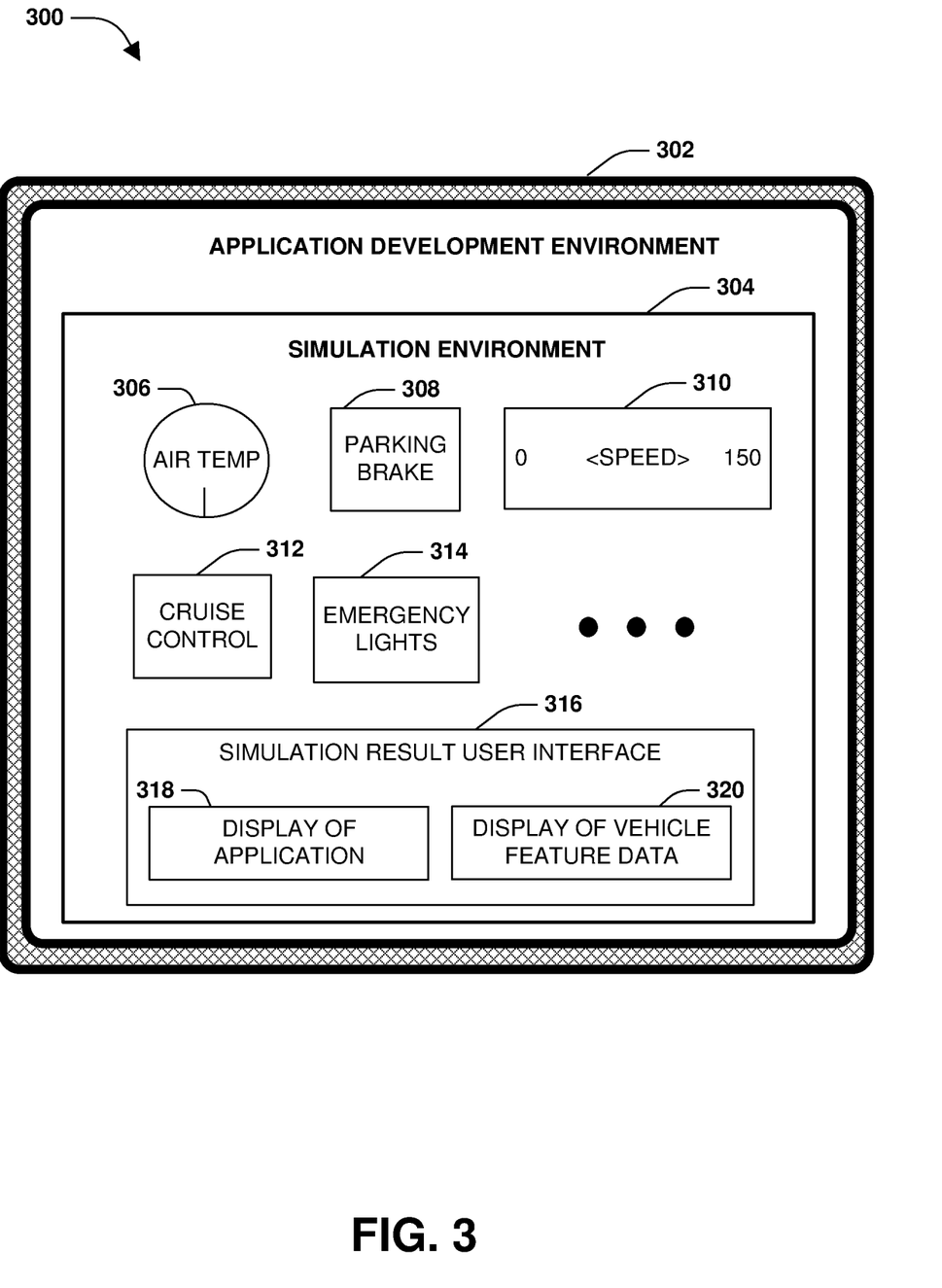
FIG. 3 is a component block diagram illustrating an exemplary system for facilitating development of an application.

FIG. 3 illustrates an example of a system 300 for facilitating simulation of an application used to access features of a vehicle. An application development environment 302 may be provided to an application developer of an application that is being developed to communicate and interact with the vehicle. For example, the application may be developed to provide users with access to an internet radio station and provide vehicle health statistics. Because the application development environment 302 may not have access to an operational vehicle, a simulation environment 304 is provided for testing the application. For example, the user may use vehicle input component user interfaces to specify various vehicle input parameter signals. For example, the user may specify an air temperature through an air temperature user interface 306, a parking brake status through a parking brake status user interface 308, a vehicle speed through a vehicle speed user interface 310, a cruise control setting through a cruise control user interface 312, an emergency lights status through an emergency lights status user interface 314, etc. In an example, the user vehicle input component user interfaces may comprise text input boxes, drop down selection lists, check boxes, visually emulated buttons and knobs, etc.

In an example, vehicle parameter signals may be programmatically created such as by an algorithm that can set various values for vehicle parameters requested by the application (e.g., if the application requests a battery charge level, then a battery charge level value may be generated and provided back to the application, or a preprogrammed battery charge level value may be provided back to the application). In another example, a drive file, within which a series of vehicle parameter values were recorded from a vehicle bus during real-time operation of a vehicle, may be used to provide the series of vehicle parameters values to the application (e.g., acceleration that may change over time during the operation of the vehicle).

In this way, vehicle parameter signals may be simulated and provided to the application for testing of the application. In an example, the simulation may be controlled based upon a vehicle profile for the vehicle. The vehicle profile may specify what telemetry data is allowed to be accessed by the application, what vehicle features are allowed to be access by the application, how a user interface of the application is allowed to be rendered such as through a vehicle display, what notifications are allowed to be provided to the user, what types of general attributes and specific attributes are available, what input commands are allowed and how to interpret such, what supplementary information is to be obtained and provided, etc.

Simulating and providing the vehicle parameters to the application may result in a simulation result that is provided to the application developer through a simulation result user interface 316. For example, the application may request that the vehicle profile display an internet radio user interface through the vehicle display. The vehicle profile may format the internet radio user interface based upon a display property that enforces a black and white color scheme, binds the user interface to a top half of the vehicle display, etc.). The internet radio user interface may be displayed through a display of application user interface 318 so that the application developer can visualize how the internet radio user interface of the application will appear to a driver through the vehicle display. Because the application may modify various vehicle features, such as a speaker volume, vehicle feature data may be provided through a display of vehicle feature data user interface 320 so that the application developer can test whether the application is correctly modifying vehicle features (e.g., a speaker volume value may be provided through the display of vehicle feature data user interface 320).

Figure 4:
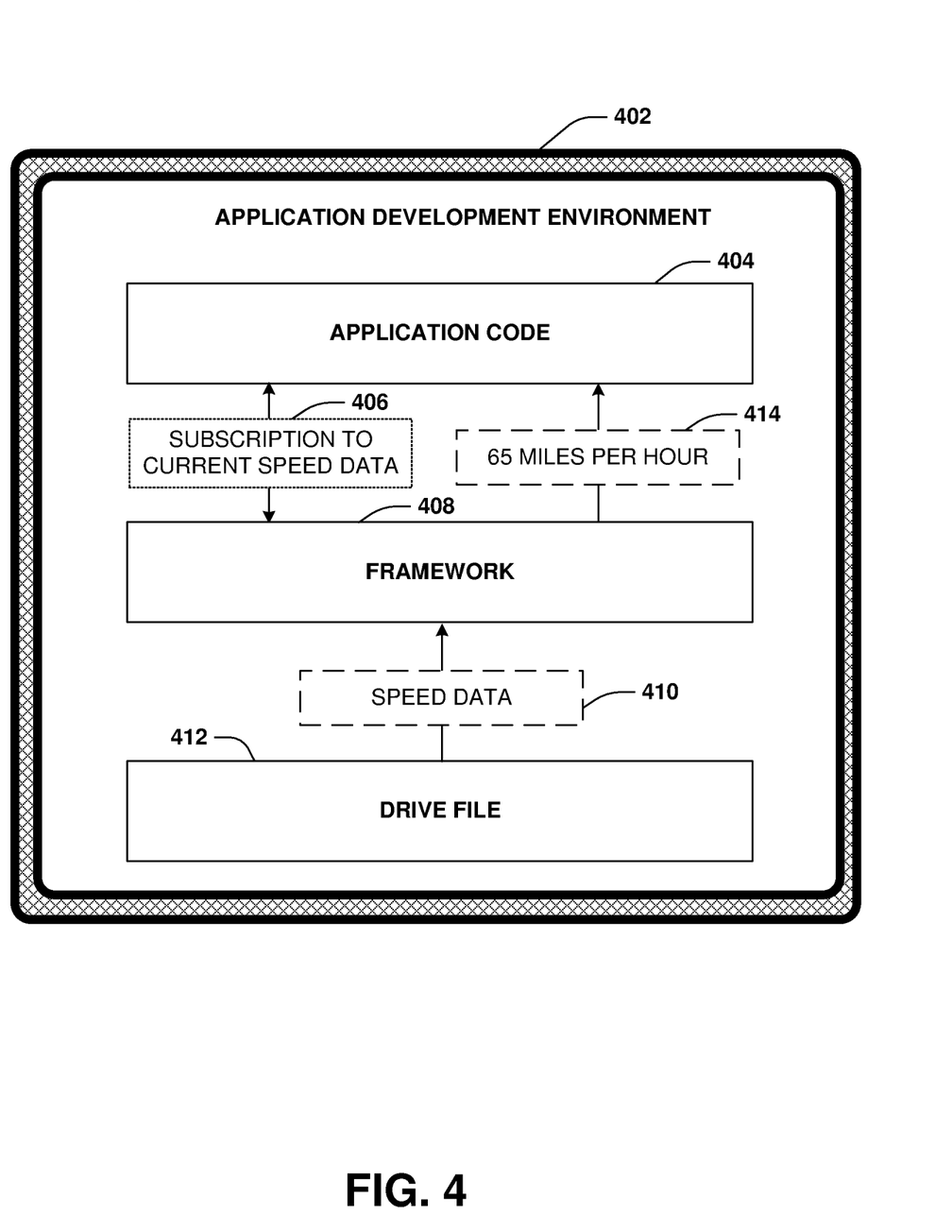
FIG. 4 is a component block diagram illustrating an exemplary system for facilitating development of an application using a framework and drive file.

FIG. 4 illustrates an example of a system 400 for facilitating simulation of an application used to access features of a vehicle. An application development environment 402 may be provided to an application developer of an application that is being developed to communicate and interact with the vehicle. For example, the application may be developed to provide users with speeding alerts and to track driving habits of the users for driving behavior improvement recommendations. Because the application development environment 402 may not have access to an operational vehicle, a framework 408 and drive file 412 may be used to provide input to application code 404 of the application. For example, the application may create a subscription 406 to current speed data of the vehicle. The framework 408 may determine that the drive file 412 comprises a series of vehicle parameter values that were recorded from a stream of vehicle speed data of a vehicle bus during real-time operation of an operational vehicle, and thus may be used to emulate/simulate vehicle speed of the vehicle to the application code 404. Accordingly, speed data 410 may be pushed from the drive file 412 to the framework 408 as an unrequested event for publishing by the framework 408 as an event to the application, such as to the application code 404 that subscribes to speed event data. In this way, the application developer can test the application as though the application had access to real-time vehicle speed data.

Figure 5:
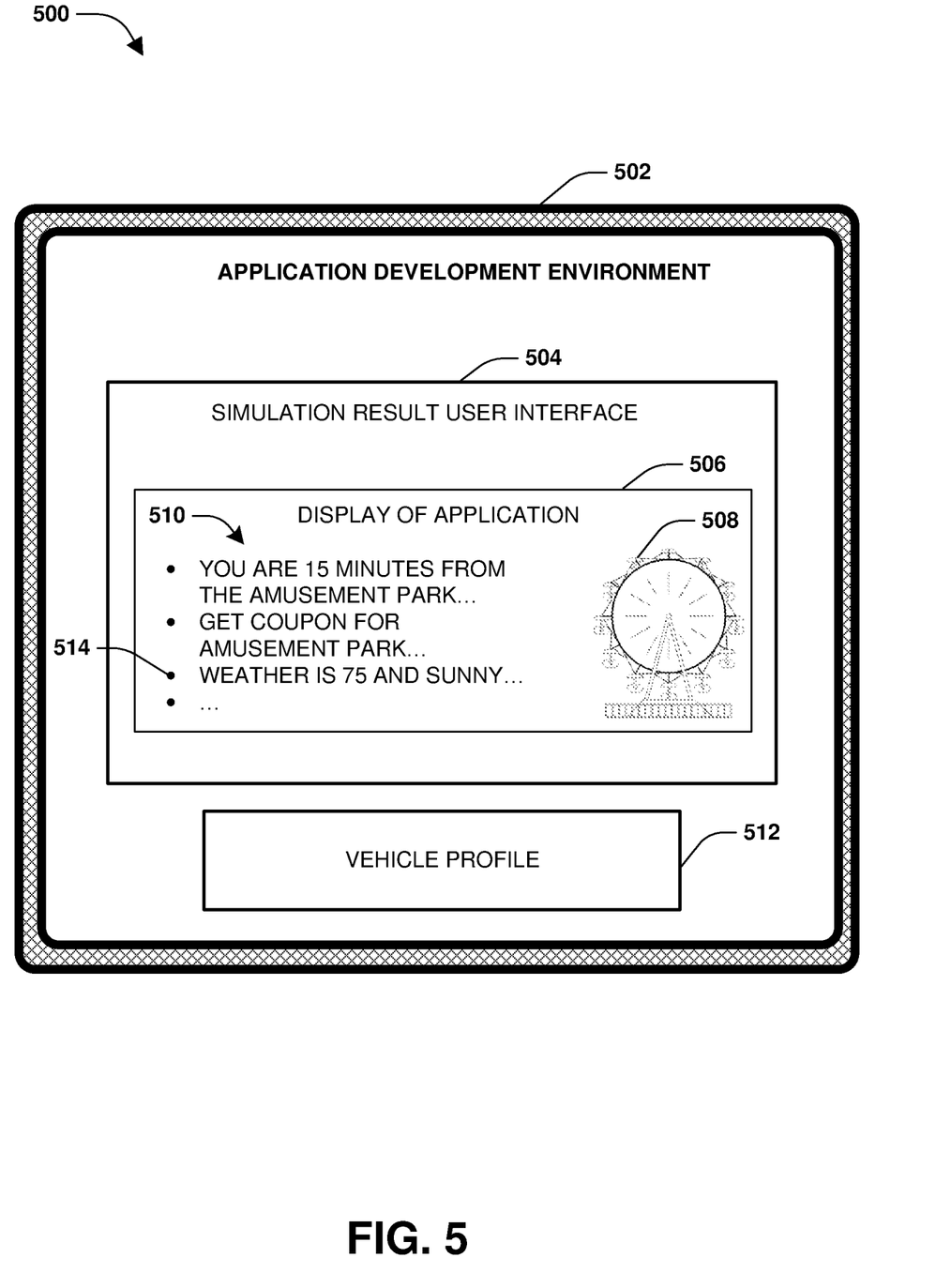
FIG. 5 is a component block diagram illustrating an exemplary system for facilitating development of an application.

FIG. 5 illustrates an example of a system 500 for facilitating simulation of an application used to access features of a vehicle. An application development environment 502 may be provided to an application developer of an application that is being developed to communicate and interact with the vehicle. For example, the application may be developed to provide users with point of interest information that is to be displayed through a vehicle display using a point of interest user interface. Because the application development environment 402 may not have access to an operational vehicle with the vehicle display (e.g., the vehicle display may have a different resolution than a laptop being used to develop the application; a vehicle profile 512 may impose a display property upon the point of interest user interface such as a color scheme, a font type, constrain display to a particular region within the vehicle display, etc.), a simulation result user interface 504 may be provided to show the application developer how the point of interest user interface may appear through the vehicle display. For example, a display of application user interface 506 may be used to show how the point of interest user interface will be rendered through the vehicle display. For example, the vehicle profile 512 may allow the application to display a Ferris wheel icon 508, but not an amusement park video. The vehicle profile 512 may reposition the Ferris wheel icon to a right side of the vehicle display. The vehicle profile 512 may reduce a font size and change a font color to blue for text 510. The vehicle profile 512 may obtain supplemental information to display with the text 510 from the application, such as supplemental weather information 514.

Figure 6:
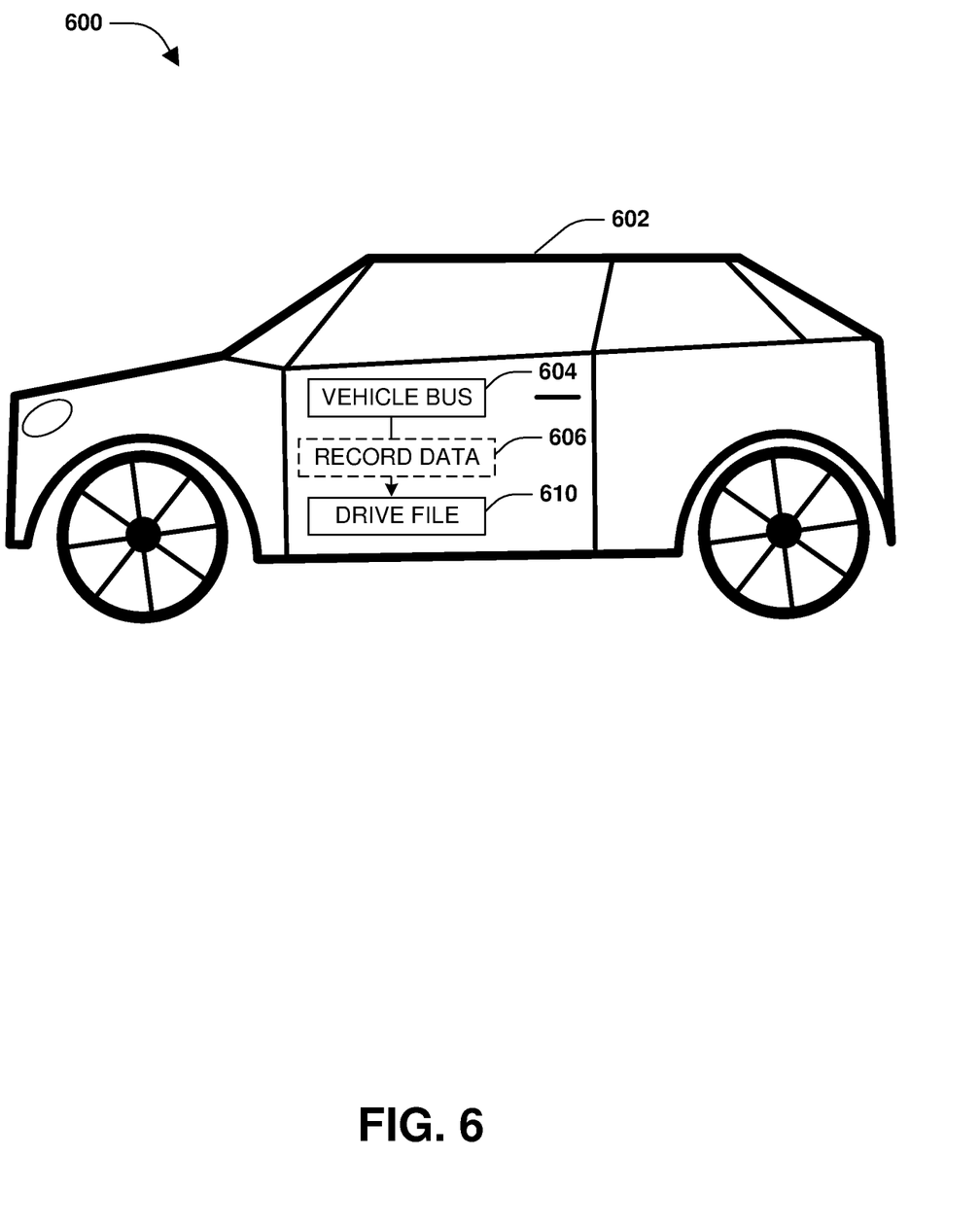
FIG. 6 is a component block diagram illustrating an exemplary system for creating a drive file.

FIG. 6 illustrates an example of a system 600 for creating a drive file 610. For example, a computing device associated with a vehicle 602 may be capable of accessing a vehicle bus of the vehicle 602 during operation of the vehicle 602. The computing device may record a stream of values from the vehicle bus, such as vehicle speed values. Filtering and throttling of data acquisition may be provided for bandwidth management, reducing wasted storage space of the drive file 610 otherwise used to store unnecessary data, merely obtaining data that will be used by application, etc. In an example, the stream of values may be filtered based upon a level of data granularity metric (e.g., applications may merely use vehicle speed values at a rate of 5 values per second, whereas the stream of values may comprise 80 values per second and thus the 80 values per second may be filtered to 5 values per second to conserve storage space). In another example, the stream of values may be filtered based upon a type of data subscribed to by applications (e.g., engine temperature values may be filtered out of the stream of values because no applications will be using engine temperature values for testing). In another example, the stream of values may be filtered based upon a set of thresholds (e.g., applications may be merely interested if oil temperature rises above a threshold value, and thus oil temperature values below the threshold value may be filtered from the stream of values to conserve storage space).

The stream of values may be stored as a series of vehicle parameter values within the drive file 610. The drive file 610 may be utilized as input to application code of an application for simulating the application interacting with the vehicle 602. That is, the drive file 610 may be used to provide the series of vehicle parameters to application code of an application being tested within an application development environment that does not have access to an operational vehicle. In an example, data may be pushed from the drive file 610 to a framework as an unrequested event for publishing by the framework as an event to applications that are subscribed to the event. In an example, the series of vehicle parameter values may be formatted into a vehicle operation concept and provided to the application code (e.g., a binary value of "1" for an interior light status may be translated into a vehicle operation concept "interior light is on" that is understood by the application code).

Figure 7:
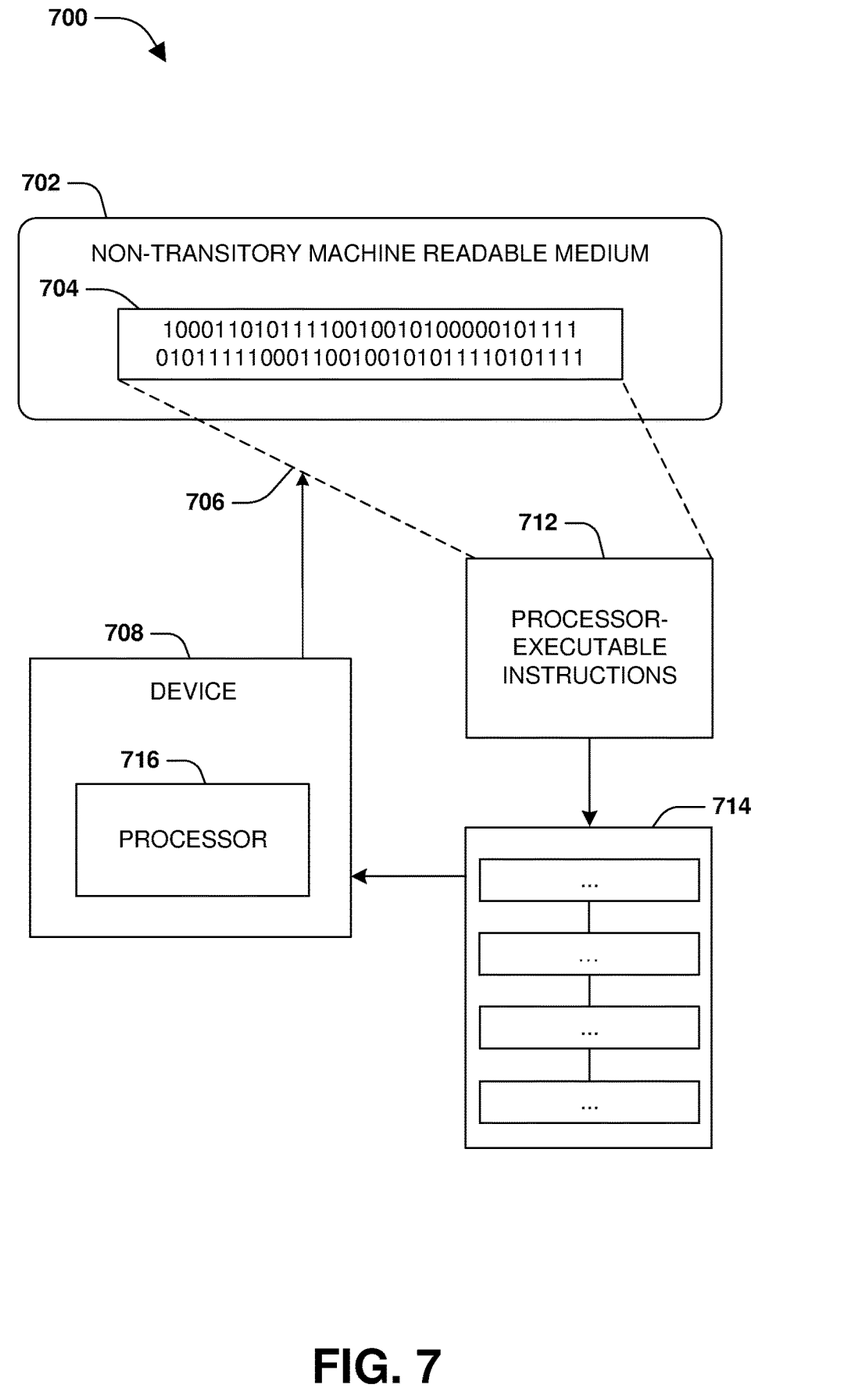
FIG. 7 is an illustration of an exemplary computing device-readable medium wherein processor-executable instructions configured to embody one or more of the provisions set forth herein may be comprised.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 100 of FIG. 1, for example. In some embodiments, the processor-executable instructions 712 are configured to cause implementation of a system, such as at least some of the example system 200 of FIG. 2, at least some of the exemplary system 300 of FIG. 3, at least some of the exemplary system 400 of FIG. 4, at least some of the exemplary system 500 of FIG. 5, and/or at least some of the example system 600 of FIG. 6, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
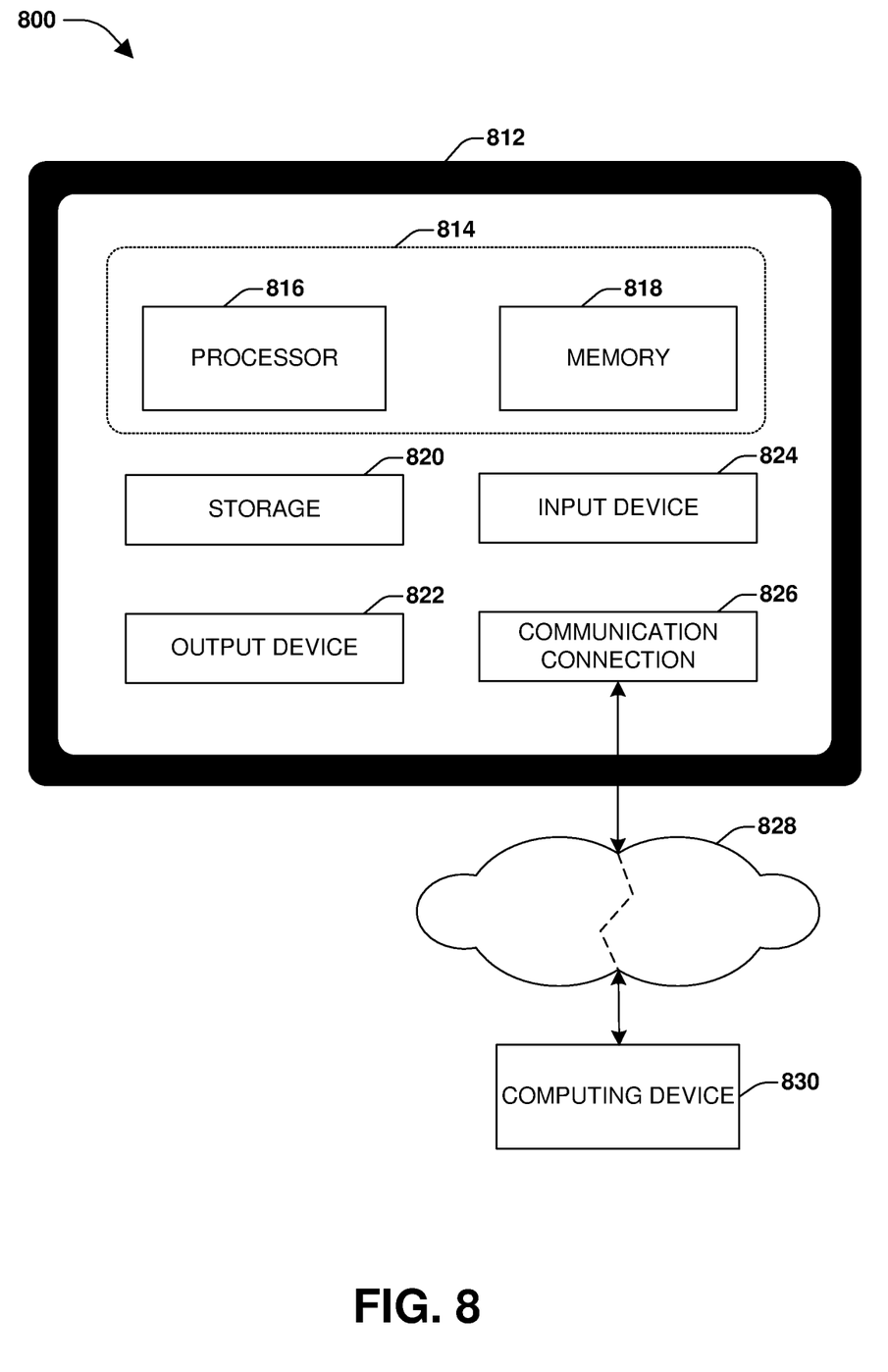
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processor 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processor 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection 826 that allows device 812 to communicate with other devices. Communication connection 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection 826 may include a wired connection or a wireless connection. Communication connection 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device 824 such as keyboard, mouse, pen, voice input device, touch input device, infrared cameras, video input devices, and/or any other input device. Output device 822 such as one or more displays, speakers, printers, and/or any other output device may also be included in device 812. Input device 824 and output device 822 may be connected to device 812 via a wired connection, wireless connection, or any combination thereof. In one embodiment, an input device or an output device from another computing device may be used as input device 824 or output device 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
executing, on a processor, instructions that cause a computing device to perform operations, the operations comprising:
in response to receiving a simulate command for simulating application code of an application being developed for interacting with a vehicle, controlling the simulation of the application code using a vehicle profile specifying features to be accessed, a format of a user interface of the application code, how to interpret input commands, and what notifications are to be provided, wherein the controlling the simulation comprises:
in response to determining that the application has a subscription to a vehicle parameter to be accessed by the application code, simulating a vehicle parameter signal of the vehicle parameter, wherein the simulating comprises:
utilizing, by a framework, a drive file comprising a series of vehicle parameter values recorded from a vehicle bus to simulate the vehicle parameter signal; and
pushing the series of vehicle parameter values from the drive file to the framework as an unrequested event for publishing by the framework as an event to the application;
publishing, by the framework, the vehicle parameter signal as the event to the application code to create a simulation result based upon the application having the subscription to the vehicle parameter value; and
providing the simulation result through a display of the computing device.

2. The method of claim 1, comprising:
displaying, through a simulation environment of an application development environment through which the application is being developed, a vehicle input component user interface simulating a vehicle input component of the vehicle.

3. The method of claim 2, comprising:
responsive to receiving input through the vehicle input component user interface, providing the input to the application code as a vehicle input parameter signal.

4. The method of claim 1, wherein the vehicle parameter signal is a series of values.

5. The method of claim 1, comprising:
identifying a second vehicle parameter that is to be accessed by the application code;
responsive to the vehicle profile indicating that the second vehicle parameter is allowed to be accessed by the application, simulating the second vehicle parameter; and
responsive to the vehicle profile indicating that the second vehicle parameter is not allowed to be accessed by the application, refraining from simulating the second vehicle parameter.

6. The method of claim 1, comprising:
displaying the simulation result as an interactive driver emulation experience through a simulation environment.

7. The method of claim 1, comprising:
formatting the vehicle parameter signal into a vehicle operation concept; and
providing the vehicle operation concept to the application code.

8. The method of claim 1, comprising:
filtering the vehicle parameter signal based upon a set of thresholds.

9. The method of claim 6, comprising:
responsive to receiving input through a simulation environment, providing the input to the application code as a vehicle input parameter signal.

10. The method of claim 1, comprising:
accessing the drive file comprising the series of vehicle parameter values recorded from the vehicle bus during operation of the vehicle.

11. The method of claim 10, comprising:
formatting the series of vehicle parameter values into a vehicle operation concept; and
providing the vehicle operation concept to the application code.

12. The method of claim 10, comprising:
filtering the series of vehicle parameters based upon a set of thresholds.

13. The method of claim 1, comprising:
providing access to a first application programming interface for data acquisition and interaction with a first type of vehicle; and
providing access to a second application programming interface for data acquisition and interaction with a second type of vehicle.

14. The method of claim 1, comprising:
identifying a vehicle interaction command that is to be output by the application code to the vehicle; and
simulating execution of the vehicle interaction command by a vehicle computing device of the vehicle to create a vehicle interaction simulation result.

15. A computing device comprising:
a processor; and
a memory comprising processor-executable instructions that when executed by the processor cause performance of operations, the operations comprising:
accessing a vehicle bus of a vehicle during operation of the vehicle;
recording a stream of values from the vehicle bus, wherein the recording of the stream of values is throttled based upon a level of data granularity metric corresponding to a rate at which an application will use the values;

filtering the stream of values based upon the level of data granularity metric to create a filtered stream of values;

storing the filtered stream of values as a series of vehicle parameter values within a drive file;

programmatically creating, by an algorithm based upon the series of vehicle parameters within the drive file, vehicle parameter signals by setting values for vehicle parameters requested by the application;

utilizing the vehicle parameter signals as input to application code of the application for simulating the application interacting with the vehicle; and controlling the simulation of the application using a vehicle profile specifying features to be accessed, a format of a user interface of the application, how to interpret input commands, and what notifications are to be provided.

16. The computing device of claim 15, the operations comprising:

filtering the stream of values to reduce a size of the drive file for reducing storage consumption by the drive file.

17. The computing device of claim 15, the operations comprising:

filtering the stream of values based upon a type of data subscribed to by the application.

18. The computing device of claim 15, the operations comprising:

pushing data from the drive file to a framework as an unrequested event for publishing by the framework as an event to applications that are subscribed to the event.

19. The computing device of claim 15, the operations comprising:

formatting the series of vehicle parameter values into a vehicle operation concept; and providing the vehicle operation concept to the application code.

20. A non-transitory machine readable medium having stored thereon processor-executable instructions that when executed cause performance of operations, the operations comprising:

in response to receiving a simulate command for simulating application code of an application being developed for interacting with a vehicle, controlling the simulation of the application code using a vehicle profile specifying features to be accessed, a format of a user interface of the application code, how to interpret input commands, and what notifications are to be provided, wherein the controlling the simulation comprises:

in response to determining that the application has a subscription to a vehicle parameter to be accessed by the application code, simulating a vehicle parameter signal of the vehicle parameter, wherein the simulating comprises utilizing, by a framework, a drive file comprising a series of vehicle parameter values recorded from a vehicle bus to simulate the vehicle parameter signal; and pushing the series of vehicle parameter values from the drive file to the framework as an unrequested event for publishing by the framework as an event to the application;

publishing, by the framework, the vehicle parameter signal as the event to the application code to create a simulation result based upon the application having the subscription to the vehicle parameter value; and providing the simulation result.

* * * * *